Patented June 18, 1929.

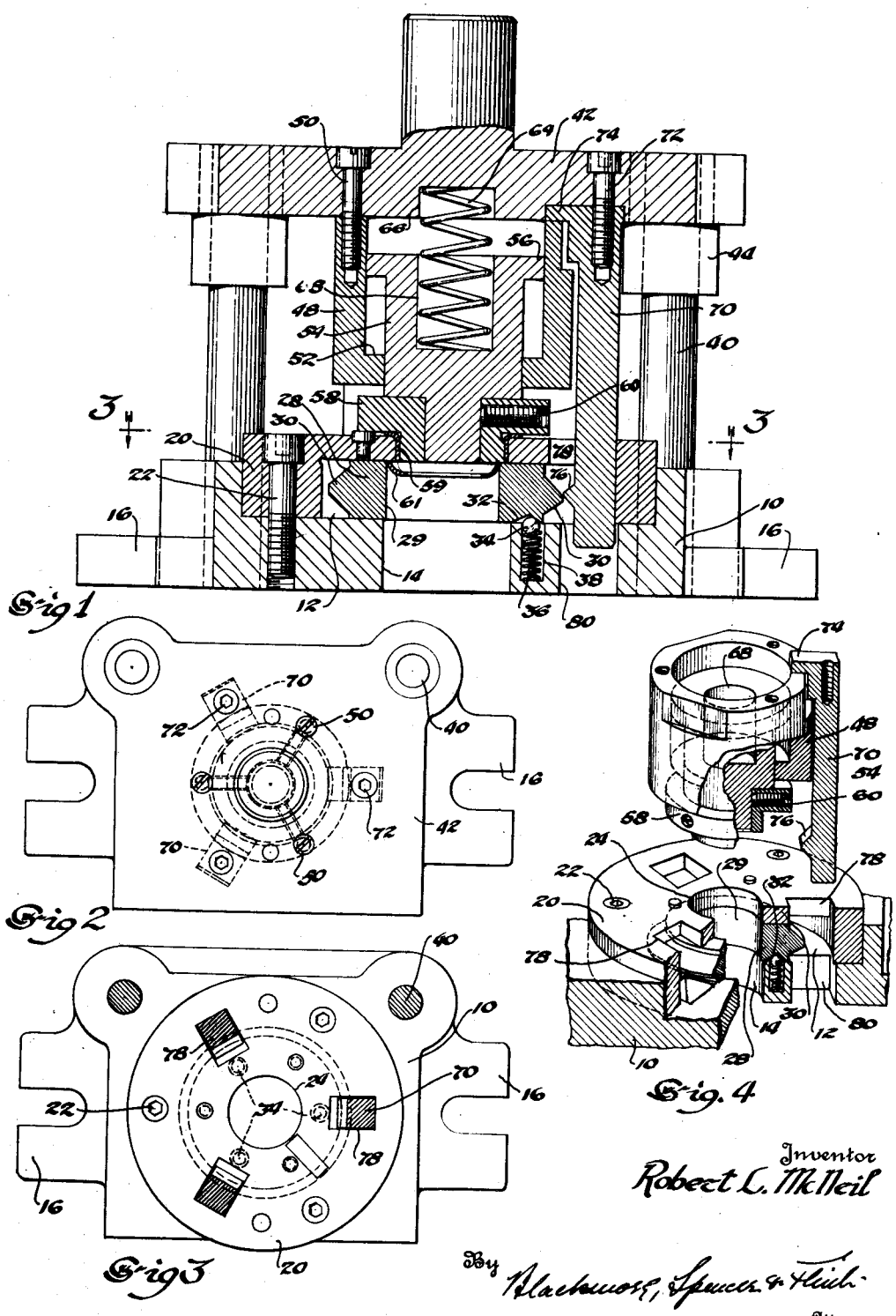

1,717,612

UNITED STATES PATENT OFFICE.

ROBERT L. McNEIL, OF OAKLAND, MICHIGAN, ASSIGNOR TO GENERAL MOTORS CORPORATION, OF DETROIT, MICHIGAN, A CORPORATION OF DELAWARE.

TRIMMING DIE.

Application filed February 4, 1928. Serial No. 251,890.

This invention relates to a machine for trimming the rough edges from metallic stampings.

In the manufacture of sheet metal articles it is a practice in the industry to stamp a sheet of metal into the desired shape and then pass the stamping through a trimming machine for removing any unnecessary part or rough edges of the metal. In an article shaped in this way the metal is usually thin and easily bent so that care must be exercised in shearing the excess metal off to prevent the stamping from being bent out of shape and from being sheared in such a manner as to leave a sharp or ragged edge.

It is an object of the present invention to provide a trimming machine in which the work is held firmly in a die while the rough edge is being trimmed off. More specifically, it is an object of the invention to provide a trimming machine of the character described in which the shearing action is performed by a flat member operated in several directions over the work so that the sheared edge will be ironed smooth.

It is a further object of the invention to provide a machine in which a work may be firmly held and trimmed by a single stroke of a plunger. I accomplish this result by supporting a shearing element close to the work and providing operating means on the plunger so that as it is moved downward to grip the die, the shearing member will be moved in several directions to trim and iron the rough edges of the work.

Other objects and advantages of the invention will appear in the course of the following description, taken in connection with the accompanying drawing and appended claims.

In the drawings:

Figure 1 is an enlarged vertical section through the center of my improved trimming die.

Figure 2 is a plan view.

Figure 3 is a horizontal section on the line 3—3 of Figure 1.

Figure 4 is a perspective view of the separated die, with parts broken away.

Referring to the drawings, I have illustrated a base 10 provided with a recess 12 on its upper side and an opening 14 down through its center. The base 10 is provided with a slotted ear 16 on each side so that it may be readily clamped to any suitable support. Fitting within the recess 12 is a work-supporting plate 20 fixed to the base 10 by means of countersunk screws 22 threaded down into the base. The plate 20 is recessed on its under side for providing a substantially annular space between the base and plate and is provided with a central aperture 24 opening into this space. While the aperture 24 is round in the illustrated embodiment, its shape will depend upon the shape of the work which is being trimmed; which work is supported by the plate during the trimming operation.

Slidable within the annular space between the work-supporting plate and base is the shearing die 28 which is provided about its periphery with an annular cam flange 30. The shearing die is formed with an opening 29 in its center which is the same size as or very slightly larger than the opening 24 in the plate 20 and is sharp on the upper edge.

The shearing die is provided on its under side with conical recesses 32, preferably three in number, each of which receives a spherical detent 34 pressed up into the conical recess by a coil spring 36 held within a recess 38 in the base 10.

In the rear corners of the base 10 are vertical bearings in each of which is slidable a guide shaft 40. The upper end of each shaft 40 is fixed in a side portion of a head 42 and is held there by means of a sleeve 44 fixed to the shaft and head. Any usual or desired means, hand operated or power operated, may be provided for vertically reciprocating the head 42. In this connection, it is obvious, of course, that the head may be held fixed and the base moved toward the head, instead of vice versa.

Supported on the under side of head 42 is a cup-shaped cylinder 48, fixed to the head by means of three spaced countersunk screws 50 extending down through the head into the rim of the cylinder. The cylinder 48 is flanged inward at its lower end, as at 52, for providing a slightly reduced opening in which is vertically slidable a die-supporting piston 54 provided at its upper end with an outward extending flange 56 fitting the inner surface of the cylinder 48. On the reduced lower end of the piston 54 is fixed a removable work engaging and holding die 58, held in position by a set screw 60 threaded through an aperture in the side of the die and pressing against the surface of the reduced lower portion of the piston. While the head is in its lowered position, as illustrated in Figure 1, the reduced lower end of the die 58 extends down within the opening 24 in the plate 20 and is slightly spaced from the interior surface thereof to allow room for the work 59. A helical spring 64 is arranged within a recess 66 in the under side of the head 42, and a recess 68 in the upper side of the piston 54, and resiliently urges the piston down into its lowest position within the cylinder 48.

Fixed to the under side of head 42 and equally spaced thereon are three circularly disposed cam rods 70, each being held in position by means of a countersunk screw 72 extending down through the head 42 and threaded into the upper end of the cam rod. In order that the cam rod may be firmly held in position, the upper end is extended within a recess on the under side of head 42 and is provided with a shoulder 74 extending inward and held in position between the head 42 and the upper edge of the cylinder 48. The work-supporting plate 20 and base 10 are provided with three sets of registering apertures 78 and 80, respectively, for permitting passage therethrough of the cam rods 70. Adjacent its lower end each cam rod is formed on its inner side with a cam surface 76 adapted to engage the annular cam flange 30 during downward movement of plunger 42. The cam surfaces 76 are in different horizontal planes on the three cam rods so that the lower portion of only one cam surface 76 will engage the annular ring 30 at a time. By this construction three sliding movements are imparted to the shearing die 28 during a single downward stroke of the head 42, the movements being in directions spaced 120 degrees apart. The amount of the lateral movement is not great enough to remove the ball 34 completely from the conical recess 32, so that when the plunger is raised and the shearing die 28 released, the three spring pressed spherical detents 32 will immediately move the die 28 back to a central position registering with the aperture 24 in the plate 20.

The operation of the device will now be described. With the head in raised position, as illustrated in Figure 4, an article to be trimmed is placed in the aperture 24 and the head is moved downward. When the die 58 contacts with the work, the latter is firmly held in the aperture in the work-supporting plate. During further downward movement of the head the cylinder 48 moves downward relative to the piston 54, compresses the spring 64 and the cam surfaces 76 of the three cam rods 70 successively engage the cam ring 30 and impart to the shearing die 28 three successive horizontal movements in directions spaced 120 degrees from each other. Since the upper edge of the shearing die 28 about the central aperture 29 is quite sharp, the lower portion 61 of the article is sheared off, and since there are three horizontal movements of the shearing die in directions spaced 120 degrees from each other, the lower edge of the work will be sheared off and ironed quite smooth. The trimmings removed from the article fall down through the opening 14 in the base of the machine.

I claim:

1. In a trimming device of the class described, a relatively fixed base; a reciprocating head movable toward said base; a work-supporting plate supported by said base, and having a central aperture shaped to correspond with an article to be trimmed; a single unitary laterally movable trimming die arranged beneath said plate, and having a central aperture corresponding in form with the aperture in said plate; a spring-pressed work-holding die carried by said head and adapted to engage an article to be trimmed and to hold it upon said plate as said head is moved downward; and a plurality of cam rods depending from said head and having each a cam, and which cams act upon said trimming die in succession during downward movement of said head to thereby move said die in a corresponding number of lateral directions.

2. In a trimming die of the class described, a relatively fixed base; a reciprocating head movable toward said base; a work-supporting plate supported above said base and spaced apart therefrom, and having a central aperture shaped to correspond with an article to be trimmed; a single unitary laterally movable trimming die located within the space between said base and work-supporting plate, and having a central aperture corresponding in form with the aperture in said plate; a plurality of spring-pressed members carried by said plate and acting upon said trimming die to return the same to its normal initial position after it has been moved therefrom; a spring-pressed work-holding die carried by said head and adapted to engage an article to be trimmed and to hold it upon said plate as said head is moved downward; and a plurality of cam rods depending from said head and having each a cam, and which cams engage said trimming die in succession during downward movement of said head to thereby move said die in a corresponding number of lateral directions.

3. In a trimming die of the class described, a relatively fixed base; a reciprocating head movable toward said base; a work supporting plate supported above said base and spaced apart therefrom, and having a central aperture shaped to correspond with an article to be trimmed; a single unitary laterally movable trimming die located within the space between said base and work-supporting plate, and having a central aperture corresponding in form with the aperture in said plate; means acting upon said trimming die to return the same to its normal initial position after it has been moved therefrom; a spring-pressed work-holding die carried by said head and adapted to engage an article to be trimmed and to hold it upon said plate as said head is moved downward; and a plurality of cam rods depending from said head and adapted to pass through openings provided for them in said work-supporting plate and said base, said cam rods having each a cam and which cams engage said trimming die in succession during downward movement of said head, to thereby move said die in a like plurality of lateral directions.

4. In a trimming die of the class described, a relatively fixed base; a reciprocating head movable toward said base; a work-supporting plate supported by said base, and having a central aperture shaped to correspond with an article to be trimmed; a single unitary laterally movable trimming die arranged beneath said plate, and having a central aperture corresponding in form with the aperture in said plate; means acting upon said trimming die to return it to its normal initial position after it has been moved therefrom; a spring-pressed work-holding die carried by said head and adapted to engage an article to be trimmed and to hold the same upon said plate during downward movement of said head, said die having a depending portion corresponding in form with the apertures in said work-supporting plate and trimming die; and means carried by said head and acting upon said trimming die to move it in a plurality of lateral directions in succession one after another, during a single continuous downward movement of said head.

5. In a trimming die of the class described, a relatively fixed base; a reciprocating head movable toward said base; a work-supporting plate supported above said base and spaced apart therefrom, and having a central aperture shaped to correspond with an article to be trimmed; a single unitary laterally movable trimming die located within the space between said base and work-supporting plate, said die having a central aperture corresponding in form with the aperture in said plate and a cam flange extending about its periphery; means acting upon said trimming die to return the same to its normal initial position after it has been moved therefrom; a spring-pressed work-holding die carried by said head and adapted to engage an article to be trimmed and to hold it upon said plate as said head is moved downward; and a plurality of cam rods depending from said head and adapted to pass through openings provided for them in said work supporting plate and said base, said cam rods having each a cam and which cams engage the peripheral flange aforesaid of said trimming die in succession during downward movement of said head, to thereby move said die in a like plurality of lateral directions.

6. In a trimming device of the class described, a relatively fixed base; a reciprocating head movable toward said base; a work-supporting plate supported by said base, and having a central aperture shaped to correspond with an article to be trimmed; a single unitary laterally movable trimming die arranged beneath said plate, and having a central aperture corresponding in form with the aperture in said plate; a spring-pressed work-holding die carried by said head and adapted to engage an article to be trimmed and to hold it upon said plate as said head is moved downward; and means carried by said head and acting upon said trimming die to move the same in a plurality of lateral directions in succession one after another, during a single continuous downward movement of said head.

In testimony whereof I affix my signature.

ROBERT L. McNEIL.